United States Patent
Fromherz et al.

(10) Patent No.: US 6,856,845 B2
(45) Date of Patent: Feb. 15, 2005

(54) MONITORING AND REPORTING INCREMENTAL JOB STATUS SYSTEM AND METHOD

(75) Inventors: Markus P. J. Fromherz, Palo Alto, CA (US); Daniel G. Bobrow, Palo Alto, CA (US)

(73) Assignee: Palo Alto Research Center Inc., Palo Alto, CA (US)

( * ) Notice: Subject to any disclaimer, the term of this patent is extended or adjusted under 35 U.S.C. 154(b) by 93 days.

(21) Appl. No.: 10/424,322

(22) Filed: Apr. 28, 2003

(65) Prior Publication Data

US 2004/0225391 A1 Nov. 11, 2004

(51) Int. Cl.[7] .............................................. G06F 19/00
(52) U.S. Cl. ......................... 700/97; 700/29; 700/100; 700/101; 700/102
(58) Field of Search .............................. 700/29, 97, 100, 700/101, 102, 107, 28, 31, 47, 103, 104; 706/14, 16

(56) References Cited

U.S. PATENT DOCUMENTS

| | | | | |
|---|---|---|---|---|
| 4,827,423 A | * | 5/1989 | Beasley et al. ............... | 700/96 |
| 5,095,342 A | | 3/1992 | Farrell et al. ................ | 355/319 |
| 5,159,395 A | | 10/1992 | Farrell et al. ................ | 355/319 |
| 5,363,175 A | * | 11/1994 | Matysek ....................... | 399/77 |
| 5,402,333 A | * | 3/1995 | Cardner ........................ | 700/31 |
| 5,442,561 A | * | 8/1995 | Yoshizawa et al. .......... | 700/100 |
| 5,557,367 A | | 9/1996 | Yang et al. ................... | 355/202 |
| 5,631,740 A | * | 5/1997 | Webster et al. .............. | 358/296 |
| 5,696,893 A | * | 12/1997 | Fromherz et al. ........... | 358/1.13 |
| 5,826,104 A | | 10/1998 | Rifkin ......................... | 395/835 |
| 5,943,484 A | * | 8/1999 | Milne et al. ................. | 700/100 |
| 6,115,646 A | | 9/2000 | Fiszman et al. ............. | 700/181 |
| 6,356,797 B1 | * | 3/2002 | Hsieh et al. ................. | 700/101 |
| 6,546,300 B1 | * | 4/2003 | Fukuda et al. .............. | 700/100 |
| 6,591,153 B2 | * | 7/2003 | Crampton et al. ........... | 700/103 |
| 2002/0072828 A1 | * | 6/2002 | Turner et al. ................ | 700/269 |

\* cited by examiner

*Primary Examiner*—Albert W. Paladini
*Assistant Examiner*—Carlos R. Ortiz
(74) *Attorney, Agent, or Firm*—Linda M. Robb

(57) ABSTRACT

For an automated manufacturing system having a number of modules with numerous alternative capabilities, a computer-controlled system provides for monitoring and reporting incremental job status. The computer-controlled system includes at least one system controller for planning and scheduling a variety of jobs submitted to the manufacturing system for processing. The system controller includes at least one planning function, which plans utilization of selected module capabilities in the production of jobs having more than one work unit. A scheduling function schedules utilization of selected module capabilities. A logging and integration function logs execution reports from the various modules in the manufacturing system.

20 Claims, 7 Drawing Sheets

MONITORING AND REPORTING INCREMENTAL JOB STATUS SYSTEM AND METHOD

CROSS REFERENCE TO RELATED APPLICATIONS

The following copending applications, U.S. application Ser. No. 10/424,620, filed Apr. 28, 2003, titled "Planning and Scheduling for Failure Recovery System and Method", U.S. application Ser. No. 10/424,661, filed Apr. 28, 2003, titled "Predictive and Preemptive Planning and Scheduling for Different Job Priorities System and Method", are assigned to the same assignee of the present application. The entire disclosures of these copending applications are totally incorporated herein by reference in their entirety.

INCORPORATION BY REFERENCE

The following U.S. patents and U.S. patent application are fully incorporated herein by reference: U.S. Pat. No. 5,696,893 ("System for Generically Describing and Scheduling Operation of Modular Printing Machine"); U.S. Pat. No. 5,826,104 ("Batch Program Status Via Tape Data Set Information for Dynamically Determining the Real Time Status of a Batch Program Running in a Main Frame Computer System"); and U.S. patent application Ser. No. 10/284,560 ("Planning and Scheduling Reconfigurable Systems with Regular and Diagnostic Jobs").

BACKGROUND OF THE INVENTION

This invention relates generally to the control and management of automated manufacturing systems, and more particularly to a system and method for dynamically and incrementally monitoring and reporting the status of jobs in complex systems having long production paths and operations being executed in parallel.

In traditional systems, the planning and scheduling software ("the scheduler", also more generally called the system control software) used to control automated manufacturing systems has no knowledge of the details of the execution of production schedules. The system control software is usually not informed about how well the scheduler's model (its belief about the system's current state, capabilities, timing constraints, etc.) reflects the reality of the actual system. At best, the software is told what parts of a schedule have been completed, what resources are currently available, and the values of a few variable timing parameters. This is illustrated in U.S. Pat. No. 5,826,104 to Riffin, cited above, which teaches an automated method to determine the real-time status of a currently running batch program on a mainframe computer system. Output from a tape management reporting system is processed so that relevant information pertaining to the progress of a currently running batch program is extracted and derived therefrom. Reports are generated that reveal the status of the batch program in terms of the processing time of the dataset associated with the batch program.

One example of an automated manufacturing system is a printing system, in which the only variable input information added to the models of the system are the availability of certain resources (e.g., if a feed tray is available) and the values of certain model parameters (e.g., the photoreceptor belt drift), and the feedback information is typically limited to what parts of a job have been completed, as shown in U.S. Pat. No. 5,696,893 to Fromherz et al. In Fromherz et al., a system is provided to allow for automated scheduling and completion of print jobs in a printing machine. A generic system for describing the functionality of various modules forming a print engine is provided for each of a plurality of subassemblies which form the printing machine. A component communicates description information about itself to a scheduling unit once it is integrated into a complete printing machine. The scheduling unit analyzes all functions available from various subassemblies and returns data representative of all available functions to the printing machine. However, the scheduler is not able to modify its models intelligently and react to failures of its plans. Also, any near failures caused by a combination of degraded execution over multiple modules cannot be detected easily, as no piece of software in the system has a global view of the execution.

This approach is unsatisfactory for complex systems having long production paths along which many operations are being executed in parallel and in different parts of the system. Neither the software nor the operator can make informed decisions about changes to the jobs, to schedules and to the execution of the jobs. For example, in the case of a failure, the scheduler needs to be able to decide whether and how to recover (e.g., by rerouting parts of the jobs being executed). In another example, if a job of priority higher than the currently executed jobs arrives, the scheduler needs to be able to reason about how to possibly change the current execution in order to accommodate the new job. Ideally, the software should also be able to take into account feedback from the actual execution of its schedules in order to improve its model and identify near-failures. (Model improvement may include, for example, updating constants to recently observed values, or removing unavailable operations. Near-failures could be used to plan more conservatively for components that seem at risk.)

In the presence of problems that arise out of the interaction of multiple modules, where each module sees only small deviations but the cumulative effect is large, system-level reporting would provide a better basis to pinpoint the source of a problem than local reporting. (For example, in the case of cumulative delays, the module reporting the fault may exhibit the effects of the accumulated delay, but an earlier module may have been the actual source of the problem.) Such an approach could also permit tight scheduling in the presence of steps whose duration or results cannot be precisely predicted in advance.

It is desirable to provide a better basis for operator decisions, failure recovery, and preemptive scheduling in complex systems, as well as to enable model adaptation and the reporting of (near) failures through reporting relevant information, transforming that information to an appropriate internal state, and querying that state for various purposes.

SUMMARY OF THE INVENTION

Briefly stated, and in accordance with one aspect of the present invention, a computer-controlled system provides for monitoring and reporting incremental job status for an automated manufacturing system having a number of modules with numerous alternative capabilities. The computer-controlled system includes at least one system controller for planning and scheduling a variety of jobs submitted to the manufacturing system for processing. The system controller includes at least one planning function, which plans utilization of selected module capabilities in the production of jobs having more than one work unit. A scheduling function schedules utilization of selected module capabilities. A logging and integration function logs execution reports from the various modules in the manufacturing system.

In accordance with another aspect of the invention, a method is provided for monitoring and reporting incremental job status for computer controlled manufacturing systems having a plurality of modules with a plurality of alternative capabilities. The method includes planning the work flow for at least one automated manufacturing system and scheduling the system capabilities. Performance commands are provided to the modules within the manufacturing system, and performance reports received from the modules are logged and integrated into the planning and scheduling functions.

In accordance with yet another aspect of the invention, an article of manufacture in the form of a computer usable medium has computer readable program code embodied in the medium such that, when the program code is executed by a computer causes the computer to perform method steps for monitoring and reporting incremental job status for computer controlled manufacturing systems, which have a number of modules with numerous alternative capabilities. The method includes planning the work flow for at least one automated manufacturing system and scheduling the system capabilities. Performance commands are provided to the modules within the manufacturing system, and performance reports received from the modules are logged and integrated into the planning and scheduling functions.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Disclosed herein is a method and system that tracks and monitors the status of scheduled production functions within a system controller, in which the controller provides for continued use of all available system capabilities and reports system state and updated module models as necessary after each capability is executed. To accomplish this, the current schedule and the events reported by system modules are incrementally integrated in a coordinated manner as jobs are executed and a log of plan execution may be formed. These forms of information give the system control software the ability to better report system status to an operator, and it provides a basis for detecting failures and near failures, for failure recovery, and for preemptive scheduling. The system and method apply to control software used for multi-step production processes such as manufacturing, printing, or assembly and provide for the handling of complex operations over complex paths to provide flexible routing, optimal productivity, and optimal load balancing. In the following description numerous specific details are set forth in order to provide a thorough understanding of the present invention. It would be apparent, however, to one skilled in the art to practice the invention without such specific details. In other instances, specific implementation details have not been shown in detail in order not to unnecessarily obscure the present invention.

Figure 1:
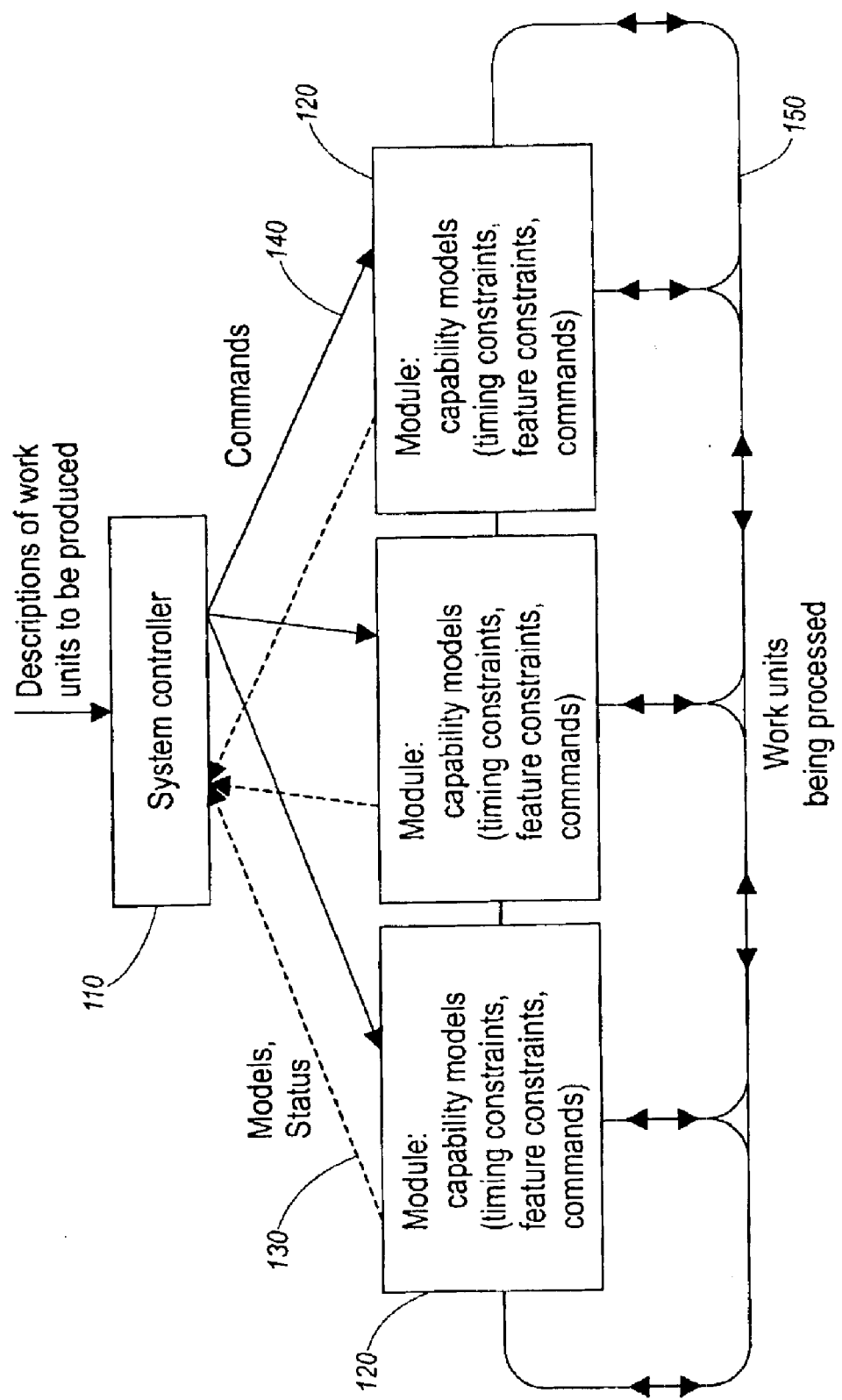
FIG. 1 illustrates a system for monitoring and reporting incremental job status in accordance with one embodiment of the subject invention.

Turning now to the drawings, wherein the purpose is for illustrating the embodiments of the system and method, and not for limiting the same, FIG. 1 illustrates a controller for monitoring and reporting incremental job status in conformance with one embodiment of the subject system. In a system 100, system controller 110 receives descriptions of work units to be produced from any known type of job input source. These descriptions correspond to descriptions of the desired output products or other goals to be achieved. They may specify attributes (or properties) of the products, values or ranges or general constraints for these attributes, and possibly constraints on the timing of the production (e.g., deadlines), but generally without specifying how the products are to be produced.

System controller 110 also receives, along paths 130, capability models and performance log information from each module 120 in the system. The capability models are descriptions of how the modules move and transform work units, generally together with information about the attributes and timing of the work units. Models may be sent to the system controller only once when the production system is started up, or the models may be updated regularly or when changes occur. Such changes in the modules (and therefore in the models) may, for example, be the reconfiguration of the modules, changes in timing values, and the unavailability of resources (and thus some capabilities). The capability models include, for example, timing constraints (e.g., the duration of execution of a capability, the time during which a resource is occupied, or the reservation of a resource), feature constraints (e.g., limits on the size of the work units being processed, transformation of the work units such as changing the orientation of a part or adding two parts together), and commands (e.g., the names or identifications of the operations corresponding to the capabilities, together with times and possibly other information). The timing and feature constraints describe when and how a capability can be applied to a work unit. The commands are the commands that are sent to the modules in order to start the corresponding operations.

Modules 120 may encompass many varying types of production systems, for example machine modules of a print engine, such as a feeder module, mark engine module, finisher module, or transport module. Alternatively, modules 120 may include the analysis modules of a biotech screening system, which may comprise a preparation module, heating module, mixing module, analysis module, or transport robot. Manufacturing line modules may include a machining module, assembling module, testing module, transport robot, or packaging module. A packaging line may include a bottle filling module or a labeling module. System controller 110 considers all possible system capabilities when searching for schedules for the desired work units.

Planning and scheduling some or all of the desired work units of one or more jobs results in a set of selected and scheduled capabilities. With these available, the system controller 110 sends the instruction commands corresponding to the scheduled capabilities to modules 120 along paths 140. Each of the modules then performs its task sequence for the completion of the specified job. As can be seen in path 150, which illustrates the path of the work units being processed, work may cycle repeatedly within a particular module 120 before moving to the next module in succession, or work may cycle repeatedly among several modules before passing to a third module. Although only three modules 120 are illustrated for the purposes herein, it will be understood that a system may include numerous modules, depending on the complexity of the job requirements. The modules may have various configurations within a system that is reconfigurable. Additionally there is also capability for operator feedback as to the work being scheduled on the modules and the state of the system at any point in time.

Figure 2:
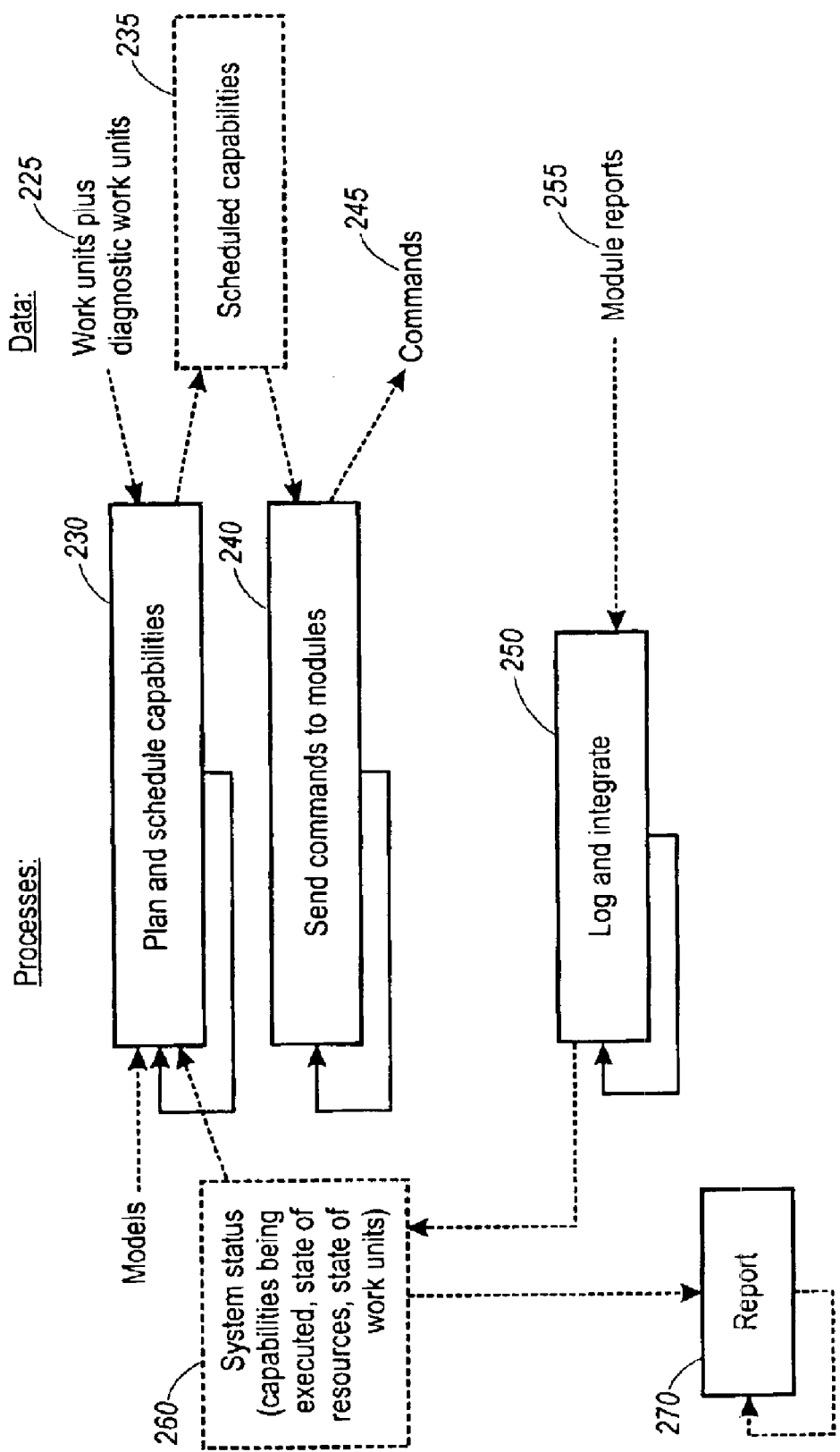
FIG. 2 provides a flow chart detailing the ordering of operations to accomplish monitoring and reporting of incremental job status in accordance with one embodiment of the subject invention.

The system control software plans and schedules jobs by selecting capabilities and determining the timing variables of these capabilities. FIG. 2 illustrates the planning, scheduling, monitoring and reporting method of operation for the system controller. In this diagram, method steps are described in terms of data received and provided to each subsequent step in the process. Each of the steps 230, 240, and 250 in this process may be executed in sequence (one after the other) or concurrently. In either case, each step consumes data 225, 235 or 255 provided by a previous step or another action within the system, and produces data 235, 245, and ultimately 270 for subsequent steps or other system operations. Consuming and producing this data is generally done incrementally, where a step is processing one data item after another, but may also be done in batches, as will be obvious to one skilled in the art of real-time software. Initially, a description of the work units 225, or job to be performed, is provided to the controller. If diagnostic jobs have to be performed, corresponding work units are inserted concurrently into the job queue. Diagnostics jobs typically have higher priority and therefore are added in front of other work units to be processed. An example of a diagnostic work unit may be an ordinary or special work unit that is to be routed to and through a module being serviced, e.g., in order to observe and measure the timing or alignment of components. A diagnostic job may use other modules, e.g., to feed the required work unit to the module being serviced. A diagnostic job may be restricted to certain modules, a specified path through the system, or to certain module capabilities as needed.

The controller also has the models of the system modules available together with the current state of the system 260, e.g., which operations are currently performed by the modules, and any capabilities it may have previously planned and scheduled. The selected work units plus any optional diagnostic work units 225 are then transmitted to step 230, which plans and schedules the capabilities for the selected work units, taking into consideration the capability model for each module. (An example of one approach to performing planning and scheduling for the purposes described herein is described in U.S. patent application Ser. No. 10/284,560, fully incorporated by reference hereinabove.) This is repeated for each work unit and diagnostic work unit selected in the previous step, and a set of scheduled capabilities 235 is created. These are in turn provided to step 240, at which the controller sends the commands 245 corresponding to the scheduled capabilities to the individual modules. This procedure is repeated for each scheduled capability.

In order to simplify integrating or comparing status and log information from the modules, plans and schedules may be structured and represented in multiple ways. One approach is to structure the information by work unit, such that all parts of a schedule relevant to a particular work unit can easily be found and manipulated. Another approach is to structure the information by module, such that all parts of a schedule (and all schedules) using a particular module can easily be found and manipulated. It is further advantageous to crosslink these representations such that, for example, all schedules using given module(s) can be found first and then all future parts of these schedules can be found and manipulated efficiently. Similarly, if schedules of a subset of work units have to be updated, the cross-linked representation allows one to efficiently find other schedules that may be affected because they using some of the same modules as the updated schedules.

Modules incrementally report the execution of capabilities at the same level of detail as defined in their models. For example, a transport module may define a "move" capability with an input time, an output time, an input work unit (and its attributes), an output work unit (and its attributes), and some constraints between these (e.g., time constraints between the time variables, attribute transformations between the work unit variables, etc.); if the system control software selects and schedules that capability (determining values for the time and attribute variables as needed), a command will be sent to the module to execute this capability at the given time, and the module will report back the actual values (or the differences to the expected values) for the model variables (times, attributes, resources). These module reports 255 are logged at 250 and integrated to build a detailed log of the execution of its schedules. The log may explicitly or implicitly include a history of the system's behavior. For example, instead of a single value for timing values, the log may maintain a distribution of values, including frequency or likelihood of occurrence. This information is then utilized to update the system status 260 and generate a system report 270.

Figure 3:
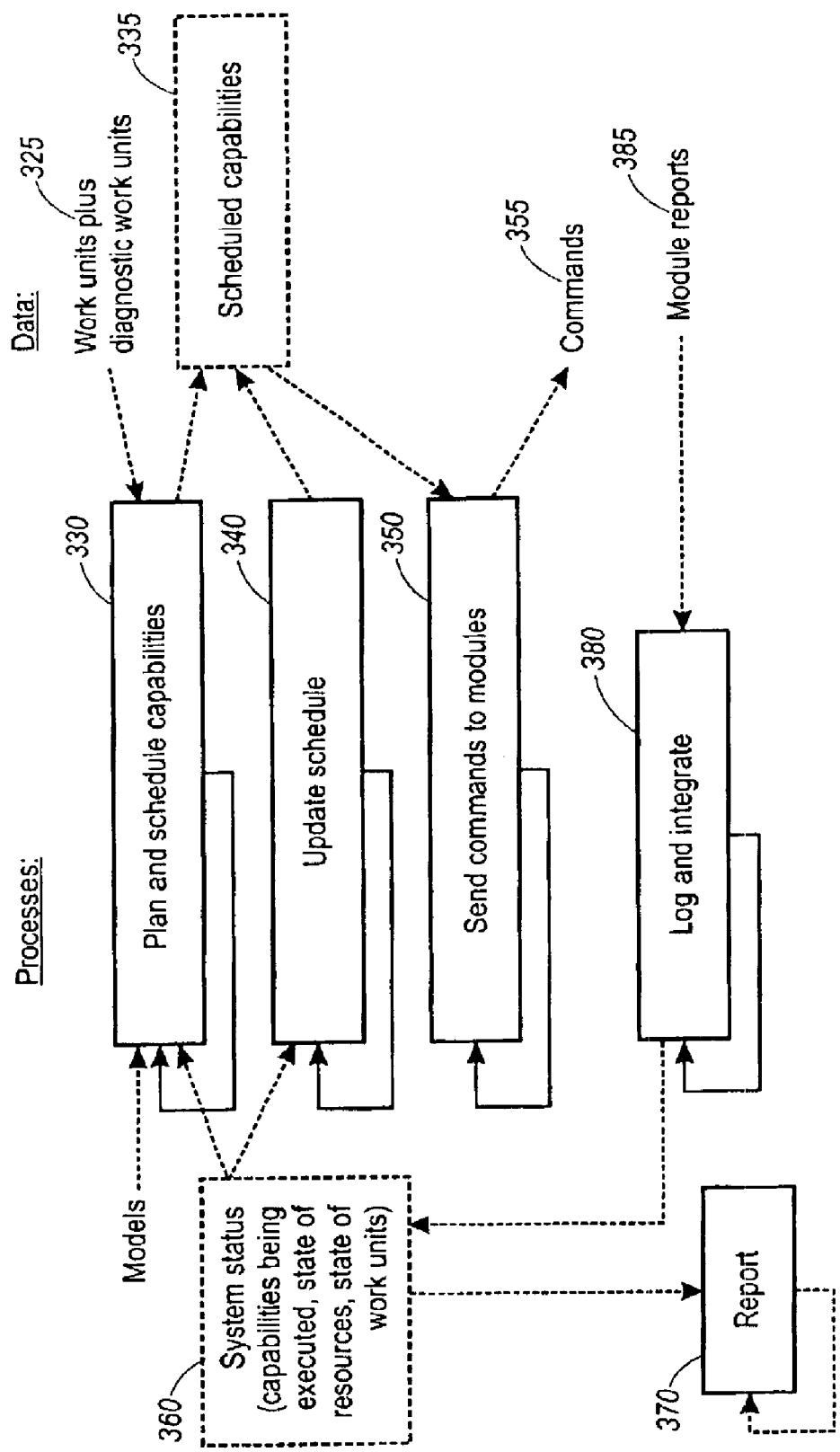
FIG. 3 provides a flow chart detailing the ordering of operations to accomplish monitoring and reporting of incremental job status in accordance with an embodiment of the subject invention including schedule updating.

In an alternate embodiment, the system control software plans and schedules jobs by selecting capabilities, determining the timing variables of these capabilities, and comparing schedules with execution. FIG. 3 illustrates the planning, scheduling, monitoring, reporting, and schedule updating method of operation for the system controller. In this diagram, method steps are described in terms of data received and provided to each subsequent step in the process. Each of the steps 330, 340, and 350 in this process may be executed in sequence (one after the other) or concurrently. In either case, each step consumes data 325, 335, or system behavior updates provided by a previous step or another action within the system, and produces data 335, 355, and ultimately 370 for subsequent steps or other system operations. Consuming and producing this data is generally done incrementally, where a step is processing one data item after another, but may also be done in batches, as will be obvious to one skilled in the art of real-time software. Initially, a description of the work units 325, or job to be performed, is provided to the controller. If diagnostic jobs have to be performed, corresponding work units are inserted concurrently into the job queue.

The controller also has the models of the system modules available together with the current state of the system 360, e.g., which operations are currently performed by the modules, and any capabilities it may have previously planned and scheduled. The selected work units plus diagnostic work units 325 are then transmitted to step 330, which plans and schedules the capabilities for the selected work units, taking into consideration the capability model for each module. This step is repeated for each work unit and any optional diagnostic work unit selected in the previous step, and an initial set of scheduled capabilities 335 is created. At 340, schedules are updated based on a comparison with received execution data from 360. By updating or attempting to update schedules, the scheduler's facility to generate correct schedules (e.g., constraint solver) can be used to detect if production is becoming inconsistent due to execution differences. For example, if operations on a work unit are delayed, work units of the same jobs may be produced out of order. By comparing and integrating such execution differences into its schedules, the scheduler can immediately detect such inconsistencies.

Consistent differences between model predictions and actual behavior (e.g., in the timing) can be used to modify the models. For example, if the time between start and finish of a capability is consistently longer than described in the model, the model's timing constraint can be modified to better reflect the current actual behavior, or to suggest a possible (current or imminent) failure. Furthermore, if a distribution of behavior parameters is maintained, a planner or scheduler may use those to plan more or less conservatively depending on its risk threshold. For example, for low-priority jobs, where delay can be tolerated, operations may be scheduled closer to the edge of observed timing values (at the risk of occasional deadline misses) than for other jobs. Updated schedules 340 are incorporated into scheduled capabilities 335 to refine the system schedules.

Scheduled capabilities 335 are in turn provided to step 350, at which the controller sends the commands 355 corresponding to the scheduled capabilities to the individual modules. This step is repeated for each scheduled capability. Modules incrementally report the execution of capabilities at the same level of detail as defined in their models. For example, a transport module may define a "move" capability with an input time, an output time, an input work unit (and its attributes), an output work unit (and its attributes), and some constraints between these (e.g., time constraints between the time variables, attribute transformations between the work unit variables, etc.); if the system control software selects and schedules that capability (determining values for the time and attribute variables), a command will be sent to the module to execute this capability at the given time, and the module will report back the actual values (or the differences to the expected values) for the model variables (times, attributes, resources). These module reports 385 are logged at 380 and integrated to build a detailed log of the execution of its schedules. The log may explicitly or implicitly include a history of the system's behavior. For example, instead of a single value for timing values, the log may maintain a distribution of values, including frequency or likelihood of occurrence. This information is then utilized to update the system status 360 and generate a system report 370.

Figure 4:
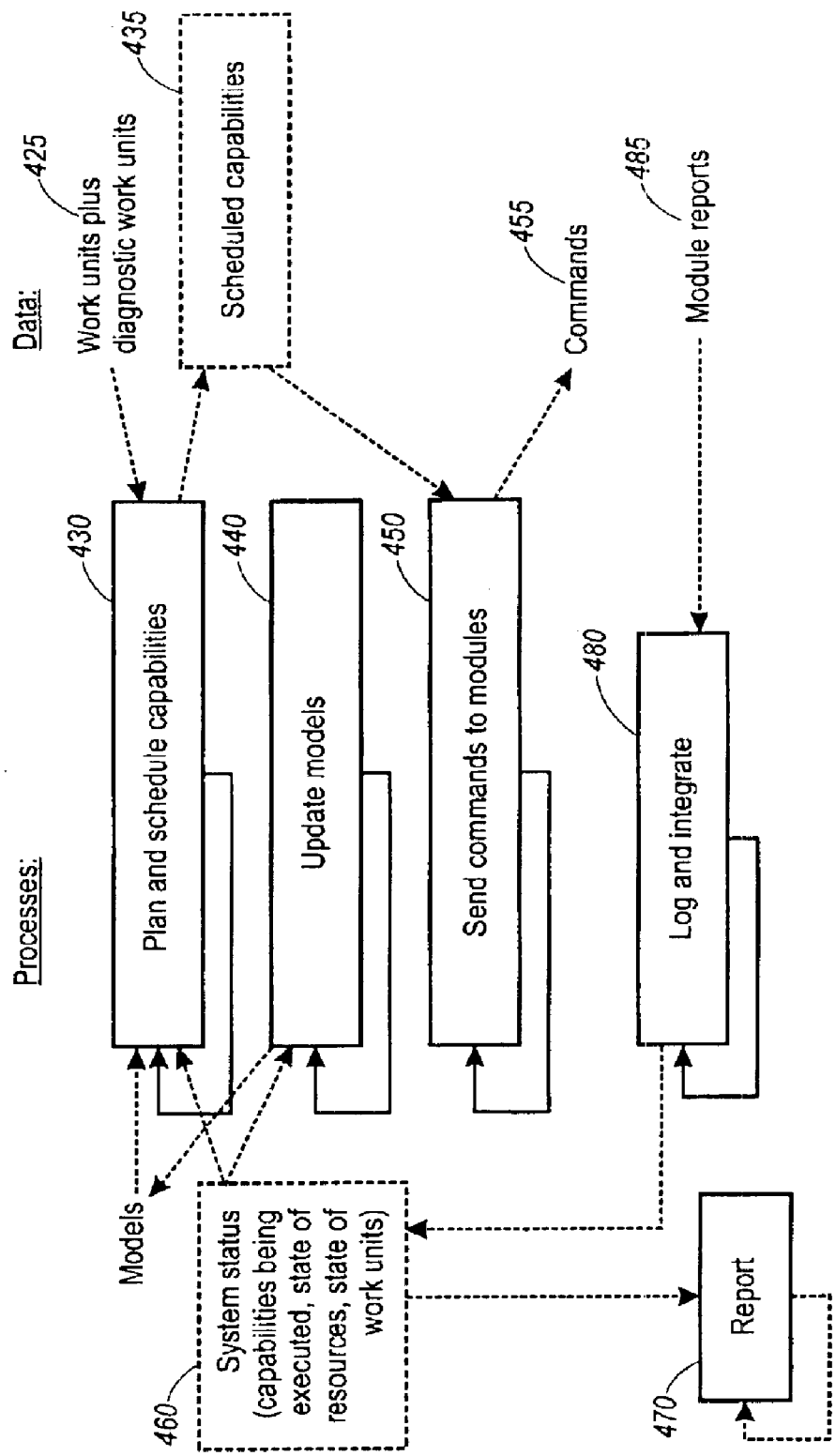
FIG. 4 provides a flow chart detailing the ordering of operations to accomplish monitoring and reporting of incremental job status in accordance with an embodiment of the subject invention including model updating.

In an alternate embodiment, the system control software plans and schedules jobs by selecting capabilities, determining the timing variables of these capabilities, and building a more accurate model of the current state of the system. FIG. 4 illustrates the planning, scheduling, monitoring, reporting, and model updating method of operation for the system controller. In this diagram, method steps are described in terms of data received and provided to each subsequent step in the process. Each of the steps 430, 440, and 450 in this process may be executed in sequence (one after the other) or concurrently. In either case, each step consumes data 425, 435, or system state behavior updates provided by a previous step or another action within the system, and produces data 435, 455, and ultimately 470 for subsequent steps or other system operations. Consuming and producing this data is generally done incrementally, where a step is processing one data item after another, but may also be done in batches, as will be obvious to one skilled in the art of real-time software. Initially, a description of the work units 425, or job to be performed, is provided to the controller. If diagnostic jobs have to be performed, corresponding work units are inserted concurrently into the job queue.

The controller also has the models of the system modules available together with the current state of the system 460, e.g., which operations are currently performed by the modules, and any capabilities it may have previously planned and scheduled. The selected work units plus diagnostic work units 425 are then transmitted to step 430, which plans and schedules the capabilities for the selected work units, taking into consideration the capability model for each module. This step is repeated for each work unit and any optional diagnostic work unit selected in the previous step, and a set of scheduled capabilities 435 is created. At 440, models of the state of the system are updated based on a comparison with received system status data from 460. The state of the system includes which capabilities are in the process of being executed, the state of resources (e.g., use of a roller and orientation of a switch), and the state and location of work units. This detailed log and status can be displayed to the operator or stored for later presentation to a service technician. The representation of logs may mirror that of schedules. In particular, the schedule representation includes time interval allocations in a resource constraint system for work units and various operations (e.g., the presence of a sheet in a roller for a certain interval leads to an allocation in the corresponding resource for that roller during that interval). Similarly, work unit locations and resource states reported by the modules can be used to make allocations in resources that mirror those of the schedule.

As an alternative, only those reports deviating significantly from the expectations may be logged. In addition to being logged, deviations may be used to directly modify the schedule's constraints, so that the schedule (up to the current real time) always reflects the actual execution. By comparing time intervals, attribute transformations and other elements of the schedules with those of the actual execution, it becomes possible to infer which components of a model have to be updated. Choosing similar representations and cross-linking different structures as described earlier enables the system controller to make such inferences efficiently. Updated system state information 440 is incorporated into the models which are utilized in planning and scheduling capabilities at 430.

Scheduled capabilities 435 are in turn provided to step 450, at which the controller sends the commands 455 corresponding to the scheduled capabilities to the individual modules. This step is repeated for each scheduled capability. Modules incrementally report the execution of capabilities at the same level of detail as defined in their models. For example, a transport module may define a "move" capability with an input time, an output time, an input work unit (and its attributes), an output work unit (and its attributes), and some constraints between these (e.g., time constraints between the time variables, attribute transformations between the work unit variables, etc.); if the system control software selects and schedules that capability (determining values for the time and attribute variables), a command will be sent to the module to execute this capability at the given time, and the module will report back the actual values (or the differences to the expected values) for the model variables (times, attributes, resources). These module reports 485 are logged at 480 and integrated to build a detailed log of the execution of its schedules. The log may explicitly or implicitly include a history of the system's behavior. For example, instead of a single value for timing values, the log may maintain a distribution of values, including frequency or likelihood of occurrence. This information is then utilized to update the system status 460 and generate a system report 470.

Figure 5:
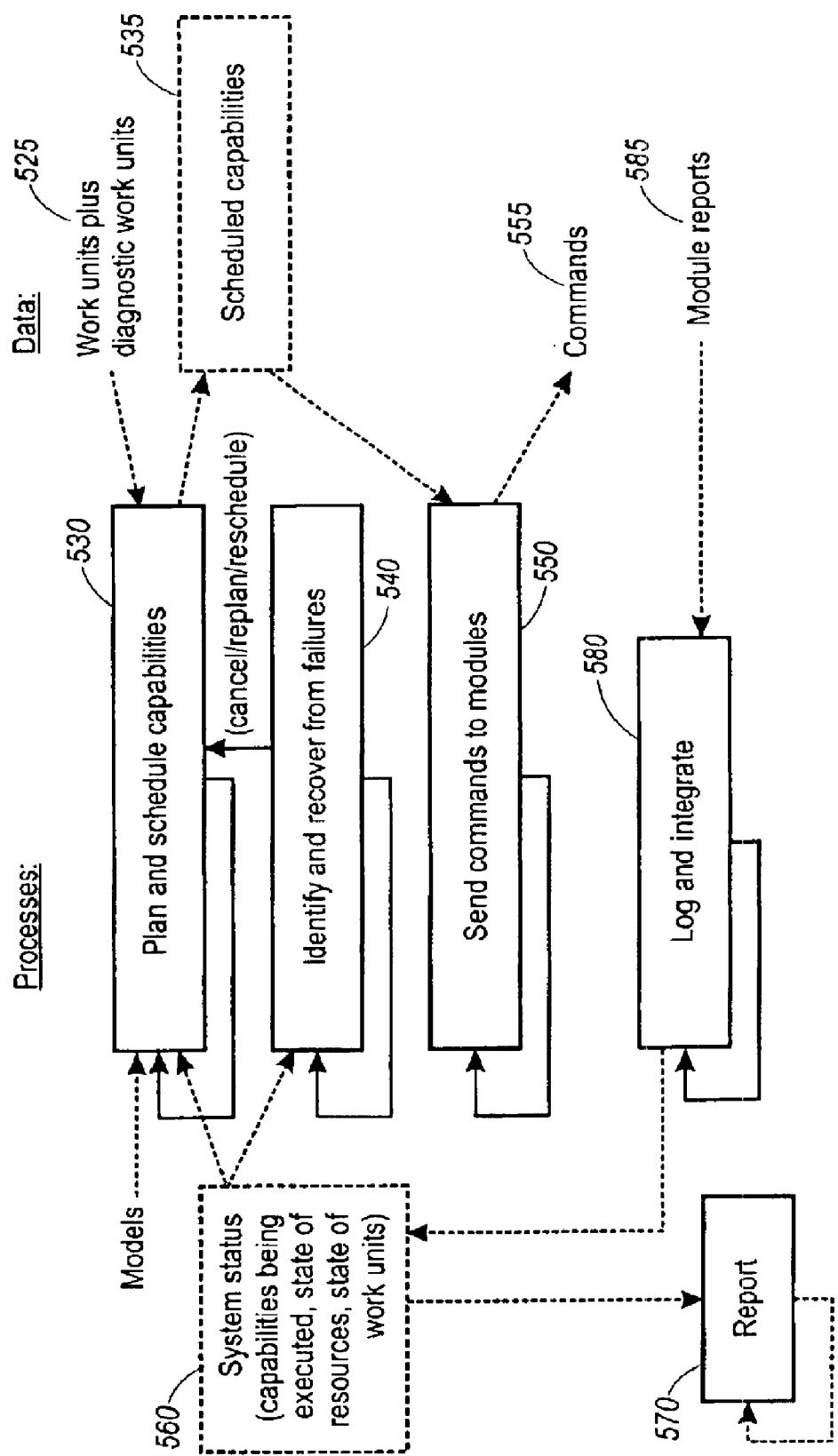
FIG. 5 provides a flow chart detailing the ordering of operations to accomplish monitoring and reporting of incremental job status in accordance with an embodiment of the subject invention including fault recovery.

In yet another embodiment, the system control software plans and schedules jobs by selecting capabilities, determining the timing variables of these capabilities, and identifying and recovering from failures to execute scheduled capabilities. FIG. 5 illustrates the planning, scheduling, monitoring, reporting, and an approach to identifying and recovering from failures by the system controller. In this diagram, method steps are described in terms of data received and provided to each subsequent step in the process. Each of the steps 530, 540, and 550 in this process may be executed in sequence (one after the other) or concurrently. In either case, each step consumes data 525, 535, or discrepancies between schedule and execution provided by a previous step or another action within the system, and produces data 535, 555, and ultimately 570 for subsequent steps or other system operations. Consuming and producing this data is generally done incrementally, where a step is processing one data item after another, but may also be done in batches, as will be obvious to one skilled in the art of real-time software. Initially, a description of the work units 525, or job to be performed, is provided to the controller. If diagnostic jobs have to be performed, corresponding work units are inserted concurrently into the job queue.

The controller also has the models of the system modules available together with the current state of the system and information as to discrepancies between schedule and execution 560, e.g., which operations are currently performed by the modules, and any capabilities it may have previously planned and scheduled. The selected work units plus any optional diagnostic work units 525 are then transmitted to step 530, which plans and schedules the capabilities for the selected work units, taking into consideration the capability model for each module. This step is repeated for each work unit and diagnostic work unit selected in the previous step, and a set of scheduled capabilities 535 is created. At 540, failures are identified and a recovery mode is identified based on schedule and execution discrepancy data from 560. Concretely, any (significant) discrepancy between schedule and execution points to a possible failure. (Failures may be either current faults that need intervention, or imminent faults that may still be avoided.) Thus, the software has to identify whether the reported execution will still satisfy the constraints given by jobs and models. For example, if a work unit stays longer in a module than expected, will it overlap (i.e., collide) with other scheduled work units? If a work unit is delayed, will it still satisfy the precedence constraints with respect to other work units? If a work unit transformation (e.g., change in orientation) wasn't executed, is that critical? This reasoning can be done by modifying the schedule based on the module reports and then checking it against the constraints.

If the constraints continue to be satisfied, no further action should be necessary. (This also allows the modules some autonomy in resolving local issues, which further improves robustness.) By updating or attempting to update schedules according to the module reports, the scheduler's facility to generate correct schedules (e.g., constraint solver) can be used to detect if production is becoming inconsistent due to execution differences. For example, if operations on a work unit are delayed, work units of the same jobs may be produced out of order (and thus precedence constraints will be violated) or work units may collide (and thus resource constraints will be violated). By comparing and integrating such execution differences into its schedules, the scheduler can immediately detect such inconsistencies.

If the constraints are no longer satisfied, the detailed system state provides a basis for determining whether and how the system can recover from the failure. For example, a typical result of failure is that parts of a job will violate their precedence constraints (i.e., would come out in a different order than desired because of delays of some work units) or will not be produced at all (because modules that were scheduled to produce them went off-line). The state will help identify those parts, such that the system control software can recover, perhaps by replanning or rerouting these jobs. System failure identification and failure recovery mode are provided to planning and scheduling step 530 for incorporation into the dynamic system schedule.

Scheduled capabilities 535 are in turn provided to step 550, at which the controller sends the commands 555 corresponding to the scheduled capabilities to the individual modules. This step is repeated for each scheduled capability. Modules incrementally report the execution of capabilities at the same level of detail as defined in their models. For example, a transport module may define a "move" capability with an input time, an output time, an input work unit (and its attributes), an output work unit (and its attributes), and some constraints between these (e.g., time constraints between the time variables, attribute transformations between the work unit variables, etc.); if the system control software selects and schedules that capability (determining values for the time and attribute variables), a command will be sent to the module to execute this capability at the given time, and the module will report back the actual values (or the differences to the expected values) for the model variables (times, attributes, resources). These module reports 585 are logged at 580 and integrated to build a detailed log of the execution of its schedules. The log may explicitly or implicitly include a history of the system's behavior. For example, instead of a single value for timing values, the log may maintain a distribution of values, including frequency or likelihood of occurrence. This information is then utilized to update the system status 560 and generate a system report 570.

Alternatively, modules may report their behavior only if it deviates (significantly) from the expected behavior, which reduces reporting overhead. Since modules have access to their own models, no special communication with the system controller is needed. In order to determine whether a module is about to fail, it is necessary to know the current observed behavior values and the limits on those values. However, closeness to a failure also depends on controllability, i.e., "within 5% of the limit" may be acceptable for a module with tight control but near-catastrophic for a module that has poor sensing capabilities.

Figure 6:
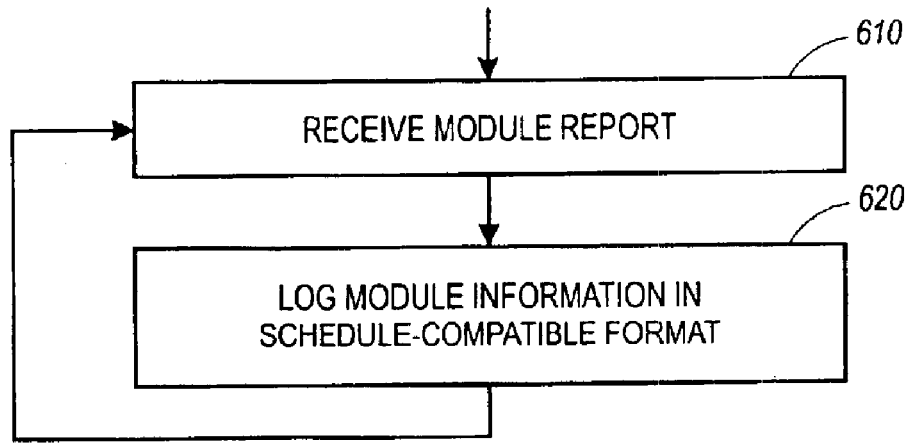
FIG. 6 provides a flow chart detailing the operation of the logging component in accordance with one embodiment of the subject invention.

Turning now to FIG. 6, logging and integration of information contained in module reports is presented in more detail. As described hereinabove, the module reports that are received at 610 incrementally report the execution of capabilities for the actual values for the model variables. In response to commands to execute specified capabilities at given times, modules will report back the actual values for the model variables, such as execution times, work unit attributes, and resource uses. These reports are logged at 620 and integrated to construct a detailed log of the execution of the schedules in a schedule-compatible format, which mirrors the schedules of the scheduler. In particular, the schedule representation includes time interval allocations in a resource constraint system for work units and various operations (e.g., the presence of a sheet in a roller for a certain interval leads to an allocation in the corresponding resource for that roller during that interval). The resulting log may explicitly or implicitly include a history of the system's behavior. For example, instead of a single value for timing values, the log may maintain a distribution of values, including frequency or likelihood of occurrence.

Figure 7:
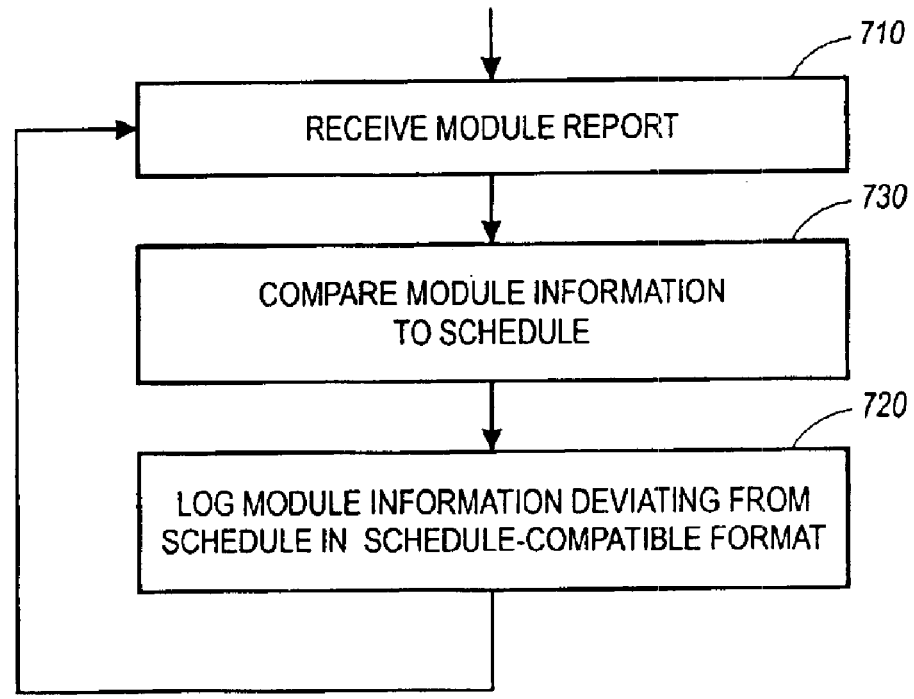
FIG. 7 provides a flow chart detailing the operation of the logging component utilizing a comparison operation in accordance with another embodiment of the subject invention.

Alternatively, the module reports may be utilized to identify and recover from failures, as shown in FIG. 7. As described hereinabove, the module reports that are received at 710 incrementally report the execution of capabilities for the actual values for the model variables. In response to commands to execute specified capabilities at given times, modules will report back the actual values for the model variables, such as times, attributes, or resources. At 720 the module reports are compared to the schedule. Only those reports deviating significantly from performance expectations may be logged at 730 to construct a detailed log of the performance deviation episodes in a schedule-compatible format, which mirrors the schedules. In particular, the schedule representation includes time interval allocations in a resource constraint system for work units and various operations (e.g., the presence of a sheet in a roller for a certain interval leads to an allocation in the corresponding resource for that roller during that interval). The resulting log is then utilized to identify failures as described hereinabove with reference to FIG. 5.

Figure 8:
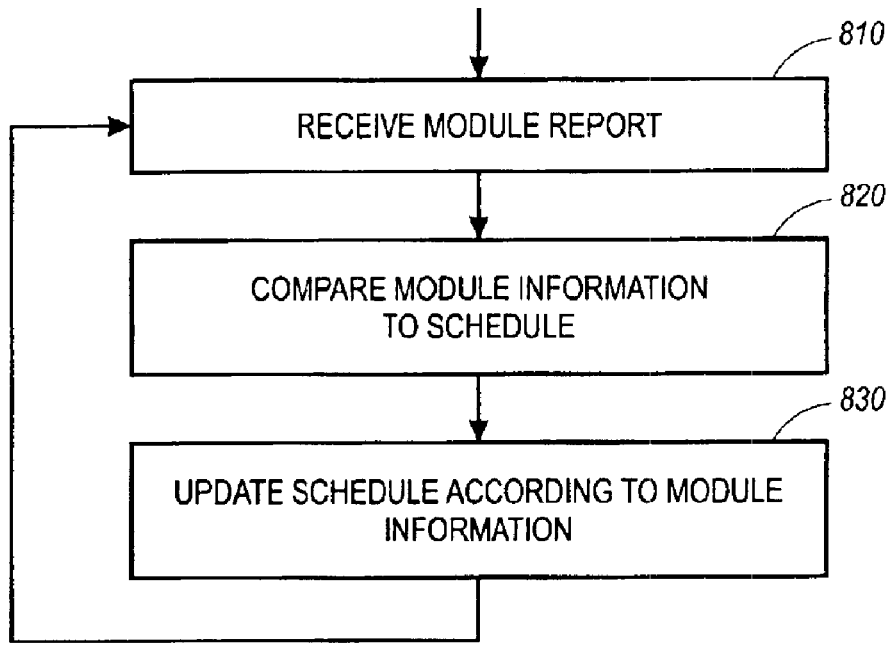
FIG. 8 provides a flow chart detailing the operation of the logging component utilizing an integration operation in accordance with another embodiment of the subject invention.

The logging feature may also be utilized in updating system schedules, as illustrated in FIG. 8. As described hereinabove, the module reports that are received at 810 incrementally report the execution of capabilities for the actual values for the model variables. In response to commands to execute specified capabilities at given times, modules will report back the actual values for the model variables, such as times, attributes, or resources. At 820 the module reports are compared to the schedule. Only those reports deviating significantly from schedule expectations may be logged and utilized to construct a detailed log of the schedule deviation episodes in a schedule-compatible format, which mirrors the schedules. In particular, the schedule representation includes time interval allocations in a resource constraint system for work units and various operations (e.g., the presence of a sheet in a roller for a certain interval leads to an allocation in the corresponding resource for that roller during that interval). In addition to being logged, at 830 these deviations may be used to directly modify the schedule's values and constraints, as described hereinabove with reference to FIG. 3, so that the schedule (up to the current real time) always reflects the actual execution.

Figure 9:
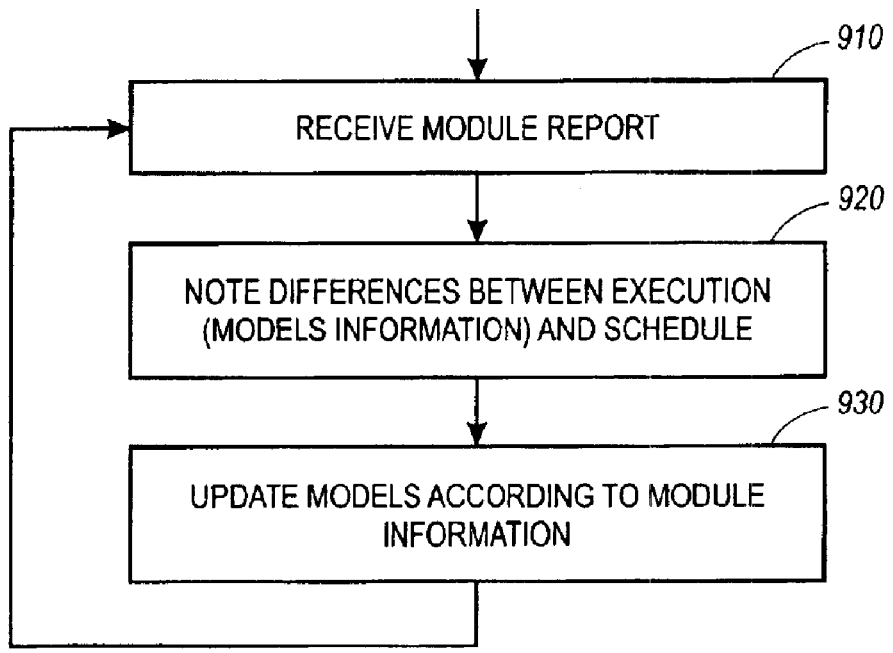
FIG. 9 provides a flow chart detailing the operation of the adaptation component in accordance with one embodiment of the subject invention.

Alternatively, the module reports may be utilized to update system models, as shown in FIG. 9. As described hereinabove, the module reports that are received at 910 incrementally report the execution of capabilities for the actual values for the model variables. In response to commands to execute specified capabilities at given times, modules will report back the actual values for the model variables, such as times, attributes, or resources. At 920 the module reports are compared to the schedule. From those reports, differences between execution and schedule are noted, and this information is used to construct a detailed log of the performance deviation episodes in a schedule-compatible format, which mirrors the schedules. In particular, the schedule representation includes time interval allocations in a resource constraint system for work units and various operations (e.g., the presence of a sheet in a roller for a certain interval leads to an allocation in the corresponding resource for that roller during that interval). The resulting log is then utilized to update models at 930 and as also described hereinabove with reference to FIG. 4.

The system and method for reporting incremental job status described herein provides a better basis for operator decisions, failure recovery, and preemptive scheduling in complex reconfigurable production systems. It also enables model adaptation and reports of (near) failures. In the presence of problems that arise out of the interaction of multiple modules, where each module sees only small deviations but the cumulative effect is large, this system-level reporting provides an improved basis for locating the source of a problem than is provided by local reporting. (For example, for cumulative delays, the module where the delay finally exceeded fault limits will report the fault, but an earlier module may be the actual source of the problem.) The method also allows tight scheduling in the presence of steps whose duration or results cannot be precisely predicted in advance. By receiving updated information about the completion of the action, a current production plan can be modified to make better use of available resources, rather than having to plan for the longer possible duration or worst possible case.

While the present invention has been illustrated and described with reference to specific embodiments, further modification and improvements will occur to those skilled in the art. For example, modules may also give qualitative reports instead of quantitative reports. As an example, instead of reporting the values of various components, modules may report that they "approach the edge of controllable behavior." Such information may include the deviation from normal behavior, the capability for compensation, and the statistical likelihood that this may happen again. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations, which do not depart from the spirit and scope of this invention.

What is claimed:

1. A computer controlled system for monitoring and reporting incremental job status automated reconfigurable manufacturing systems having a pluralyti of modules with a pluralyti of alternative capabilities, the system comprising:

a system controller for controlling system modules to automatically reconfigure operation of the plurality of modules within the reconfigurable manufacturing system, wherein said system controller includes models of the capabilties of each one of the plurality of modules in the reconfigurable manufacturing system, wherein said models of the capabilities include at least one member selected from the group consisting of timing constraints, feature constraints and commands;

at least one planning function for planning utilization of selected module capabilities in the production of job having not lees than one work unit;

at least one scheduling function for scheduling utilization of said selected module capabilities in the production of said jobs having not less than one work unit, wherein said scheduling utilization takes into consideration said capability models of each of said modules in the reconfigurable manufacturing system; and at least one logging and integration function for automatically logging and reporting to said system controller execution reports incrementally in real time from each one of the plurality of modules, wherein said execution reports comprise actual values for models variables, wherein said actual values include at least one member selected from the group consisting of execution times, work unit attributes, and resource uses.

2. The system for monitoring and reporting incremental job status for automated manufacturing systems according to claim 1, wherein said logging and integration function comprises:

means for receiving execution report from the plurality of modules; and means for logging information contained in said reports from the plurality of modules in a schedule-compatible format.

3. The system for monitoring and reporting incremental job status for automated manufacturing to claim 1, wherein said at least one scheduling function comprises means for structuring schedules with a plurality of information representations.

4. The system for monitoring and reporting incremental job status for automated manufacturing systems according claim 3, wherein at least one of said plurality of information representations comprises work unites contained within the automated manufacturing system.

5. The system for monitoring and reporting incremental job status for automated manufacturing systems according claim 3, wherein at least one of said plurality of information representations modules contained within the automated manufacturing system.

6. The system for monitoring and reporting incremental job status for automated manufacturing systems according claim 3, comprising at least one module for cross-linking said plurality of information representations.

7. The system for monitoring and reporting incremental job status for automated manufacturing systems according claim 1, wherein said logging and integration functions comprises:

means for receiving execution reports from the plurality of modules;

means for comparing module performance information contained in said report the plurality of modules with at least one module performance schedule developed by said scheduling function; and means for identifying module performance information that deviates from the module performance specified in said at least one module performance schedule; and means for logging said module performance information that deviates from the module performance specified in said at least one module performance schedule in a schedule-compatible format.

8. The system for monitoring and reporting incremental job status for automated manufacturing systems according claim 1, wherein said logging and integration function comprises:

means for receiving execution reports from the plurality of modules;

means for comparing module performance information contained in said reports from the plurality of module with a first model performance schedule developed by said scheduling function; and means for identifying module performance information that deviates from the module performance specified in said first module performance schedule; and means for updating said first module performance schedule utilizing said module performance formation that deviates from the module performance specified in said first module performance schedule.

9. The system for monitoring and reporting incremental job status for automated manufacturing systems according claim 1, wherein said logging and integration function comprises:

means for receiving execution reports from the plurality of modules;

means for noting differences between module execution performance contained in said reports from the plurality of modules and a first module execution performance specified in a first module performance schedule developed by said scheduling function; and means for updating models.

10. A method for monitoring and reporting incremental job status for automatic computer controlled reconfigurable manufacturing systems having at least one system controller and a plurality of modules with a plurality of alternative capabilities, wherein the at least one system controller includes models of the capabilities of each one of the plurality of modules in the reconfigurable manufacturing system, the method comprising:

planing the work flow for at least one reconfigurable manufacturing system having a plurality of modules;

scheduling the capabilities for said at least one manufacturing system, including taking into consideration the capability models for each of the plurality of modules;

providing performance commands to the plurality of modules within said at least one manufacturing system; and jogging and integrating performance reports received from the plurality of modules within said at list one manufacturing system, wherein said performance reports are automatically logged and reported incrementally in real time from each one of the plurality of the at least one system controller, and wherein said performance reports comprise actual values for performance variables, wherein said actual values include at least one member selected from the group consisting of execution times, work unit attributes, and resource uses.

11. The method for monitoring and reporting incremental job status for computer controlled manufacturing systems according to claim 10, wherein scheduling the capabilities for said at least one manufacturing system comprises scheduling capabilities according to plurality of capability representations.

12. The method for monitoring and reporting incremental job status for computer controlled manufacturing systems according claim 11, wherein not less than one of said capability representations comprises work units included within said at least one manufacturing system.

13. The method for monitoring and reporting incremental job status for computer controlled manufacturing systems according to claim 11, wherein not less than one of said capability representations comprises modules included within said at least one manufacturing system.

14. The method for monitoring and reporting incremental job status for computer controlled manufacturing systems according to claim 10, wherein logging said performance reports comprises:
   receiving performance reports from the plurality of modules; and
   logging information contained in said report from the plurality of modules in a schedule-compatible format.

15. The method for monitoring and reporting incremental job status for computer controlled manufacturing systems according to claim 10, wherein logging said performance reports comprises:
   receiving performance reports from the plurality of modules;
   comparing module performance information contained in said reports from the plurality of modules with at least one module performance schedule; and
   identifying module performance information that deviates from the module performace specified in said at least one module performance schedule; and
   logging said module performance information that deviates from the module performance specified in said at least one module performance schedule in a schedule-compatible format.

16. The method for monitoring and reporting incremental job status for computer controlled manufacturing systems according to claim 10, wherein logging said performance reports comprises:
   receiving performance reports from the plurality of modules;
   comparing module performance information contained in said reports from the plurality of modules with a first module performance schedule;
   identifying module performance information that deviates from the module performace specified in said first module performance schedule; and
   updating said first module performance information schedule utilizing said module performance information that deviates from the module performance specified in said first module performance schedule.

17. The method for monitoring and reporting incremental job status for computer controlled manufacturing systems according to claim 16, further comprising generating a revised performance schedule utilizing said module performance information that deviates from the module performance specified in said first module performance schedule.

18. The method for monitoring and reporting incremental job status for computer controlled manufacturing systems according to claim 10, wherein logging said performance reports comprises:
   receiving performance reports from the plurality of modules;
   noting differences between module execution performance contained in said reports from the plurality of modules and a first module execution performance specified in a first module and performance schedule; and
   updating system models.

19. The method for monitoring and reporting incremental job status for computer controlled manufacturing systems according to claim 10, further comprising generating a system report.

20. An article of manufacture comprising a computer usable medium having computer readable program code embodied in said medium which, when said program code is executed by said computer causes said computer to perform method steps for monitoring and reporting incremental job status for automatic computer controlled reconfigurable manufacturing systems having at least one system controlled and a plurality of modules whit a plurality of alternative capabilities, wherein the at least one system controller includes models of the capabilities of each one of the plurality of module in the reconfigurable manufacturing system, said method comprising:
   planning the work flow for at least one reconfigurable manufacturing system having a plurality of modules;
   scheduling the capabilties for said at least one manufacturing system, including taking into consideration the capability models for each of plurality of modules;
   providing performance commands to the plurality of modules within said at least one manufacturing system; and
   logging and integrating performance reports received from the plurality of modules within said at least one manufacturing system, wherein said performance reports are automatically logged and reported incrementally in real time from each one of the plurality of modules to the at least one system controller, and wherein said performance reports comprise actual values for performance variables, wherein said actual values include at least one member selected from the group consisting of execution times, work unit attributes, and resource uses.

* * * * *